United States Patent
Mannava et al.

(10) Patent No.: US 10,613,996 B2
(45) Date of Patent: Apr. 7, 2020

(54) SEPARATING COMPLETION AND DATA RESPONSES FOR HIGHER READ THROUGHPUT AND LOWER LINK UTILIZATION IN A DATA PROCESSING NETWORK

(71) Applicant: Arm Limited, Cambridge (GB)

(72) Inventors: Phanindra Kumar Mannava, Austin, TX (US); Bruce James Mathewson, Papworth Everard (GB); Jamshed Jalal, Austin, TX (US); Tushar P. Ringe, Austin, TX (US); Klas Magnus Bruce, Leander, TX (US)

(73) Assignee: Arm Limited, Cambridge (GB)

( * ) Notice: Subject to any disclaimer, the term of this patent is extended or adjusted under 35 U.S.C. 154(b) by 90 days.

(21) Appl. No.: 16/027,929

(22) Filed: Jul. 5, 2018

(65) Prior Publication Data

US 2019/0340138 A1 Nov. 7, 2019

Related U.S. Application Data

(60) Provisional application No. 62/666,264, filed on May 3, 2018.

(51) Int. Cl.
*G06F 12/0815* (2016.01)
*G06F 13/16* (2006.01)
*G06F 12/0813* (2016.01)

(52) U.S. Cl.
CPC ........ *G06F 13/161* (2013.01); *G06F 12/0813* (2013.01); *G06F 12/0815* (2013.01); *G06F 13/1668* (2013.01)

(58) Field of Classification Search
CPC ............. G06F 12/0831; G06F 12/0813; G06F 12/0815; G06F 12/082; G06F 2212/1024; G06F 13/161; G06F 13/1668
USPC .......................................................... 711/141
See application file for complete search history.

(56) References Cited

U.S. PATENT DOCUMENTS

| | | | |
|---|---|---|---|
| 7,996,625 B2 * | 8/2011 | Khare ................. | G06F 12/0817 711/100 |
| 2003/0009635 A1 * | 1/2003 | Arimilli .............. | G06F 12/0813 711/141 |
| 2015/0220461 A1 * | 8/2015 | Auernhammer .... | G06F 13/1642 710/310 |

FOREIGN PATENT DOCUMENTS

EP 0818732 A 1/1998

* cited by examiner

*Primary Examiner* — Hashem Farrokh
(74) *Attorney, Agent, or Firm* — Leveque IP Law, P.C.

(57) ABSTRACT

In a data processing network comprising a Request, Home and Slave Nodes coupled via a coherent interconnect, a Home Node performs a read transaction in response to a read request from a Request Node. In a first embodiment, the transaction is terminated in the Home Node upon receipt of a read receipt from a Slave Node, acknowledging a read request from the Home Node. In a second embodiment, the Home Node sends a message to the Request Node indicating that a read transaction has been ordered in the Home Node and further indicating that data for the read transaction is provided in a separate data response. The transaction is terminated in the Home Node upon receipt of an acknowledge from the Request Node of this message. In this manner, the transaction is terminated in the Home Node without waiting for acknowledgement from the Request Node of completion of the transaction.

20 Claims, 4 Drawing Sheets

SEPARATING COMPLETION AND DATA RESPONSES FOR HIGHER READ THROUGHPUT AND LOWER LINK UTILIZATION IN A DATA PROCESSING NETWORK

RELATED APPLICATIONS

This application claims the benefit of provisional application Ser. No. 62/666,264 filed May 3, 2018 and titled 'SEPARATING COMPLETION AND DATA RESPONSES FOR HIGHER READ THROUGHPUT AND LOWER LINK UTILIZATION IN A DATA PROCESSING NETWORK', the entire content of which is hereby incorporated by reference.

BACKGROUND

A multi-processor data processing system may be arranged as an on-chip network with nodes of various types, such as processors, accelerators, IO, and memory connected via an interconnect fabric. At a high level, there are three basic node types, request, home and slave. A Request Node (RN) is a node that generates protocol transactions, including reads and writes, to the interconnect. These nodes could be fully coherent processors or IO coherent devices. A Home Node (HN) is a node that receives protocol transactions from RNs. Each address in the system has a Home which acts as the Point-of-Coherency (PoC) and Point of Serialization (PoS) for requests to that address. In a typical implementation, Homes for a range of addresses are grouped together as a Home Node. Each of these Home Nodes may include a system level cache and/or a snoop filter to reduce redundant snoops.

A Slave Node (SN) is a node that receives and completes requests from the HNs. An SN could be used from peripheral or main memory.

Data from a shared data resources may be accessed by a number of different processors and copies of the data may be stored in a local cache for rapid access. A cache coherence protocol may be used to ensure that all copies are up to date. The protocol may involve the HN exchanging snoop messages with the RNs having copies of data being accessed.

The HN may serialize accesses to an address on a first-come, first-served basis. For example, access to a designated device and resources of the HN may be reserved until a current transaction has been completed. A disadvantage of this approach is that HN resources may be reserved for longer than necessary, which may adversely affect system performance.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
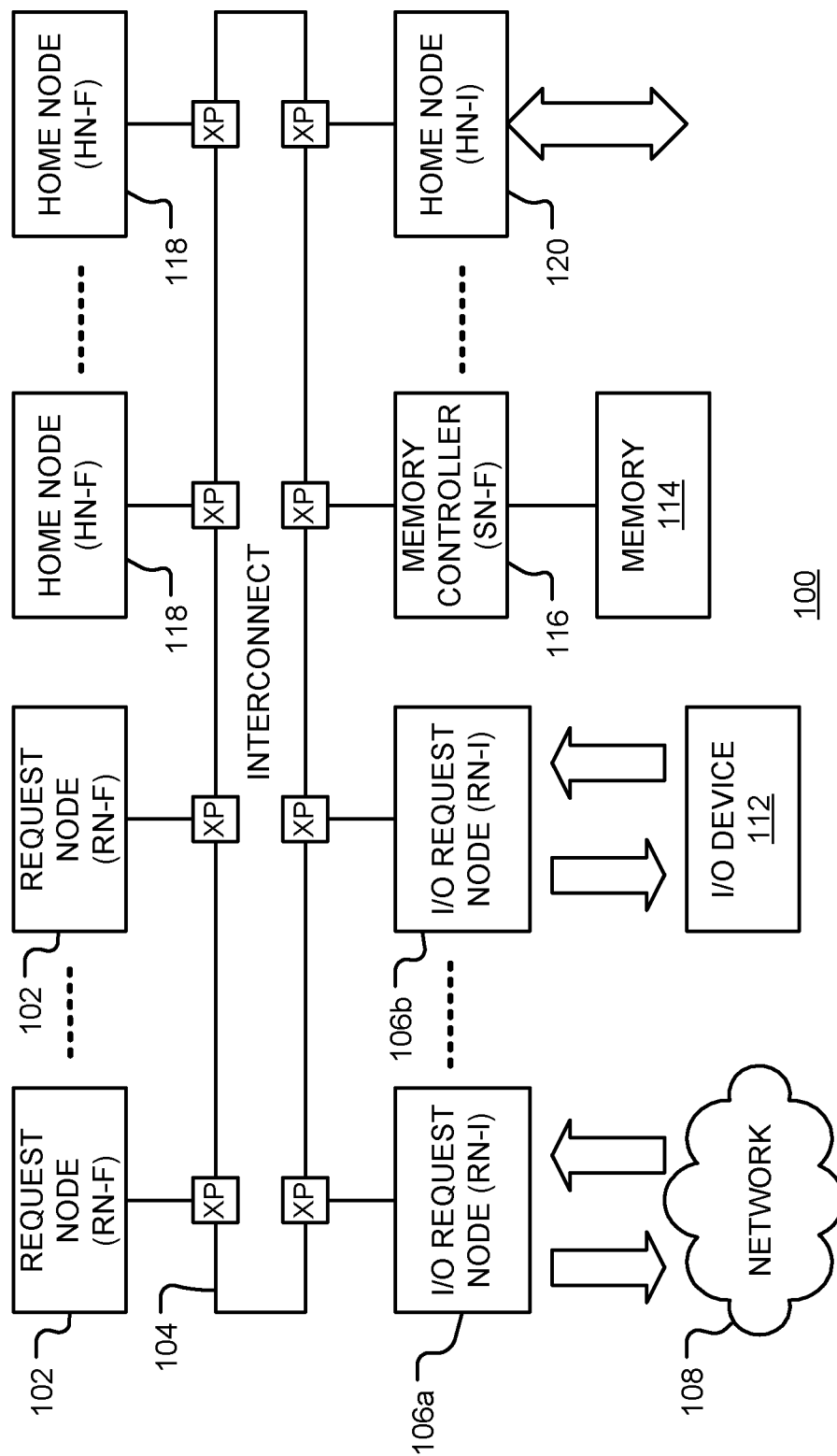
FIG. 1 is a block diagram of a data processing system, in accordance with various representative embodiments.

The various apparatus and devices described herein provide mechanisms for automatic routing and allocation of incoming data in a data processing system.

While the present disclosure is susceptible of embodiment in many different forms, there is shown in the drawings and will herein be described in detail specific embodiments, with the understanding that the present disclosure is to be considered as an example of the principles of the present disclosure and not intended to limit the present disclosure to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the embodiments described herein.

The present disclosure relates to a mechanism in a data processing network for separating completion and data responses for a data fetch operation. The disclosed mechanism reduces the number of data packet hops through the network, providing higher request throughput with lower interconnect utilization and also to permit early resource deallocation. One embodiment of the mechanism supports separate Data and Home Node responses for Read transactions.

In a data processing network comprising a Request, Home and Slave Nodes coupled via a coherent interconnect, a Home Node performs a read transaction in response to a read request from a Request Node. In a first embodiment, the transaction is terminated in the Home Node upon receipt of a read receipt from a Slave Node, acknowledging a read request from the Home Node. In a second embodiment, the Home Node sends a message to the Request Node indicating that a read transaction has been ordered in the Home Node and further indicating that data for the read transaction is provided in a separate data response. The transaction is terminated in the Home Node upon receipt of an acknowledge from the Request Node of this message. In this manner, the transaction is terminated in the Home Node without waiting for acknowledgement from the Request Node of completion of the transaction.

FIG. 1 is a block diagram of a data processing system 100, in accordance with various representative embodiments. A number of processing core clusters 102 (referred to as Request Nodes (RNs)) are coupled to data resources via coherent interconnect 104. Data is received via input/output (I/O) requesting nodes (RN-I). In the example shown, RN-I 106a comprises a network interface controller (NCI) that receives data from network 108 and RN-I 106b receives data from I/O device 112. I/O device 112 may be coupled via a peripheral component interconnect express (PCIe) bus, direct memory access (DMA) unit, or network accelerator, for example. Data may be stored in one or more memory or storage devices 114 that are coupled to interconnect 104 via one or more memory controllers 116. Home Nodes (HN) 118 and 120 may include system level caches. Each home node (HN) serves as a point of serialization and/or point of coherency for data stored at a given set of system addresses. A Home Node (HN-F), such as 118, may be a home for local resources. Alternatively, a Home Node (HN-I), such as 120, may provide an interface to off-chip resource. Data requested by a Request Node 102 may be retrieved from a system level cache of the HN or from a memory 114 via a memory controller 116 for storing in a memory 114. The memory controllers are referred to as Slave Nodes (SNs).

To avoid conflicts when multiple RNs try to access the same memory location, the Home Nodes 118 act as point of serialization, processing read requests and other transactions in a serial manner, such as first-come, first-served. Interconnect 104 is used to transfer data over data (DAT) channels between nodes. In addition, a messaging protocol is used to control each access transaction, in which requests and responses are sent over request (REQ) and response (RSP) channels in the interconnect. Finally, 'snoop' messages are sent over SNP channels in the interconnect to ensure data coherence.

An aspect of the present disclosure relates to an improved messaging and data transfer mechanism, implemented in the hardware of the nodes, that provides improved performance and efficiency of the data processing network.

Figure 2:
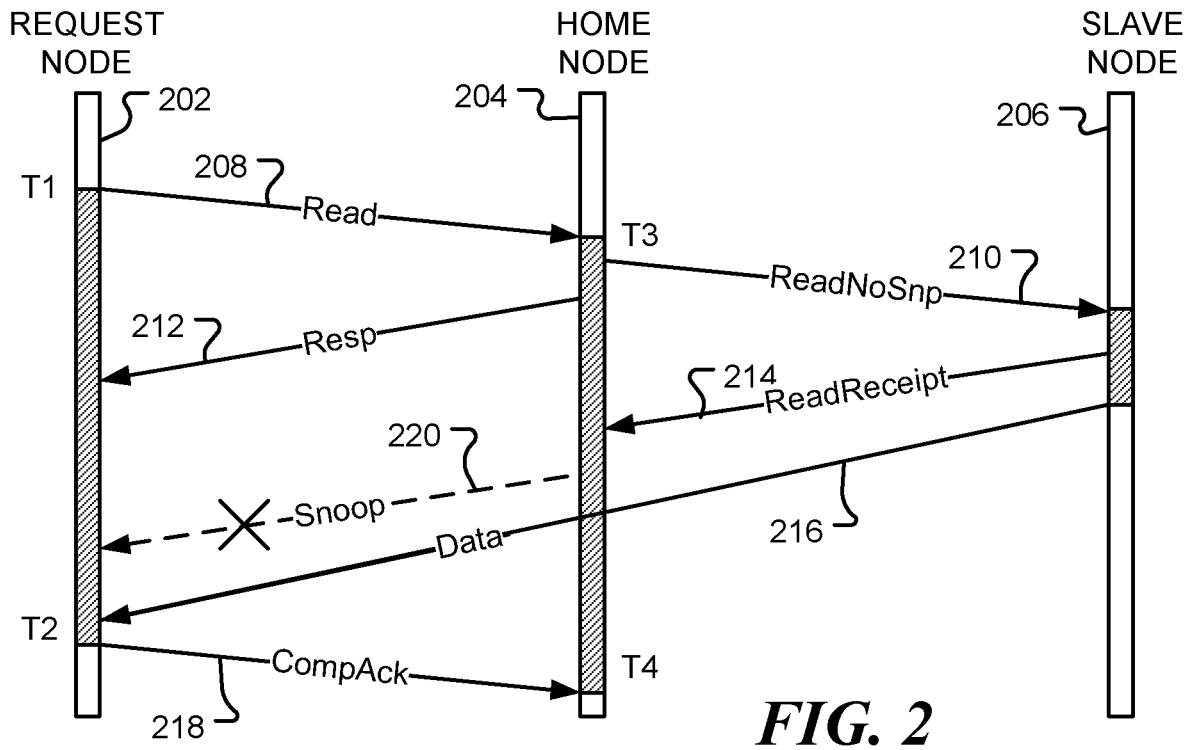
FIG. 2 is a transaction flow diagram for a conventional data access in a data processing network.

FIG. 2 is a transaction flow diagram for a conventional data access in a data processing network. In FIG. 2, vertical bars 202, 204 and 206 show time lines for a Request Node (RN), Home Node (HN) and Slave Node (SN), respectively, with time flowing from top to bottom. At time T1, RN issues Read request 208 to the Home Node for the read address. If the request data is not in the cache of the HN, first slave read request 210 (designated as 'ReadNoSnp') is sent to the appropriate SN, and the HN send first response message (Resp) 212 to the RN to confirm processing of the request. SN sends Read receipt 214 to the HN and then sends the requested data 216 to the RN. All communications are transmitted via the interconnect fabric. The data may be transmitted to the RN in multiple data beats across the interconnect. Once the requested data has been received by the RN, a completion acknowledgment (CompAck) message is sent from the RN to the HN. Thus, the duration of the transaction is T1-T2 for the RN and T3-T4 for the HN. During the period T3-T4, the HN assigns resources for the transaction (such as a tracker). In addition, the HN refrains from sending snoop messages to the RN for the addresses accessed in the Read transaction. Otherwise, for example, snoop request 220 may arrive at the RN prior to the arrival of the data from the SN.

If the requested data is present in the cache of the HN, the data is sent directly from the HN to the RN and no messages are exchanged with the SN. However, the HN must still wait for CompAck response 218, before sending a snoop, since the data and the snoop may take different paths through the interconnect, whereby the snoop arrives at the RN before some of the Data.

Figure 3:
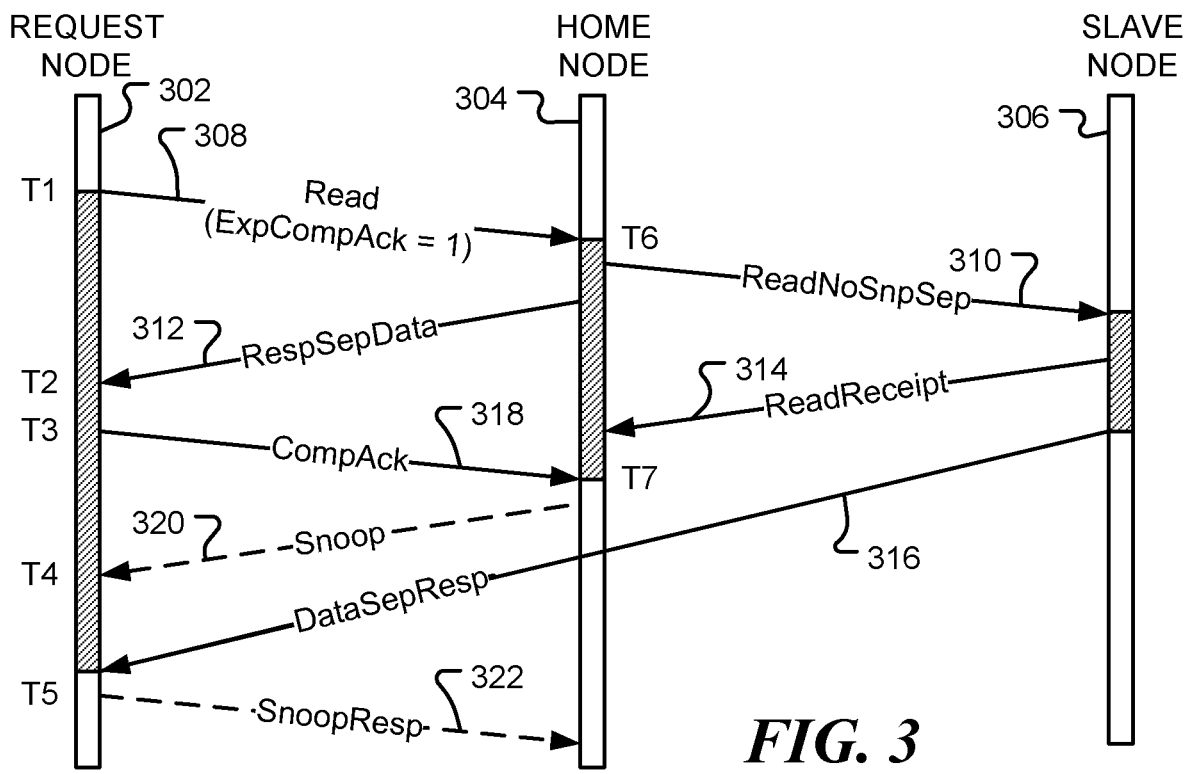
FIGS. 3-5 are transaction flow diagrams for data access, in accordance with various representative embodiments.
Figure 4:
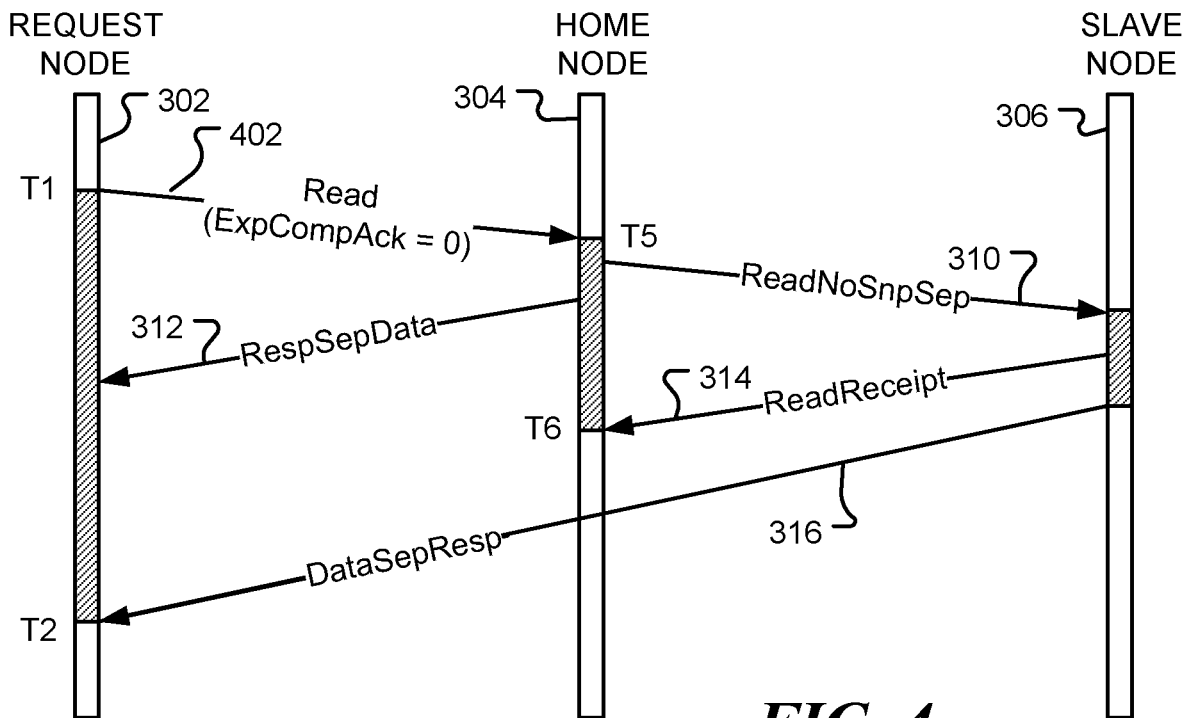
Figure 5:
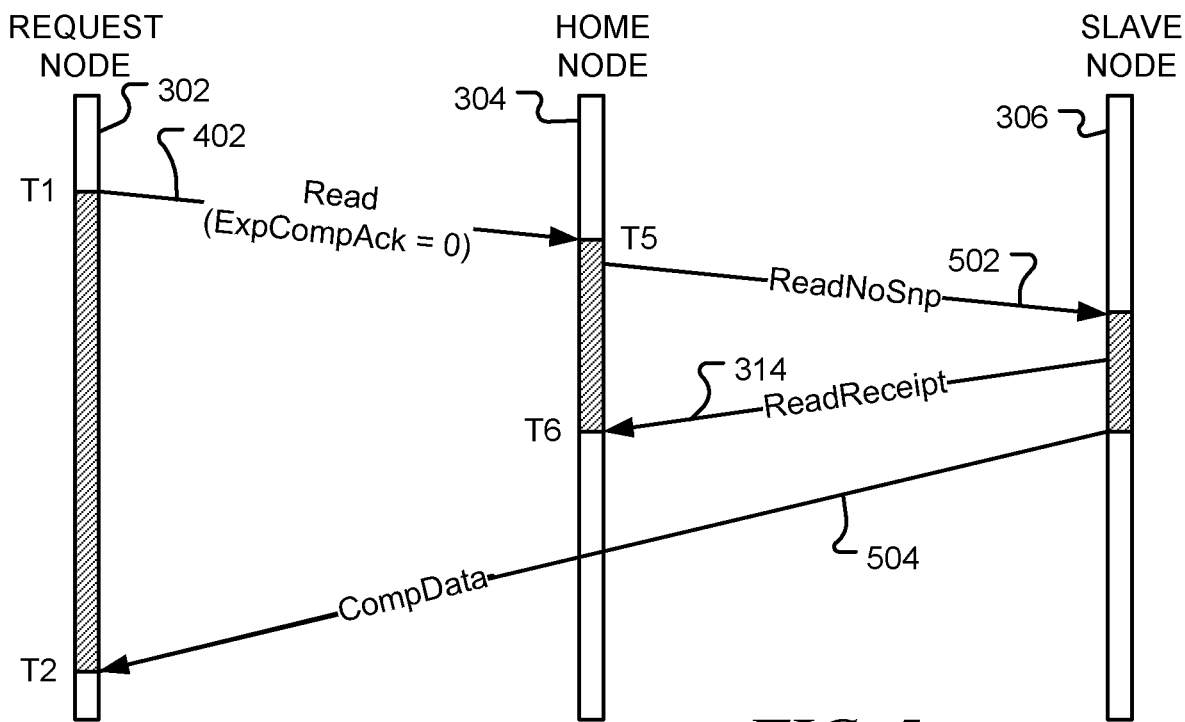

FIGS. 3-5 are transaction flow diagrams of a mechanism for data access in a data processing network, in accordance with various representative embodiments. The figures and the associated discussion below, describes the transaction structure and the dependencies that exist within an example transaction. The figures show the dependencies for a transaction with a separate Data and Home response.

FIG. 3 is a transaction flow diagram for data access in a data processing network, in accordance with various representative embodiments. Analogous to FIG. 2, in FIG. 3, vertical bars 302, 304 and 306 show time lines for a Request Node (RN), Home Node (HN) and Slave Node (SN), respectively, with time flowing from top to bottom. At time T1, RN issues Read request 308 to the Home Node for the read address. The request indicates (expCompAck=1) that the HN should expect a completion acknowledgement (CompAck) message from the RN. If the request data is not in the cache of the HN, first slave read request 310 (Read-NoSnpSep) is sent to the appropriate SN, and the HN sends first response message (RespSepData) 312 to the RN to confirm processing of the request. SN sends Read receipt 314 to the HN and then sends the requested data 316 to the RN in a second response message. However, in contrast the mechanism shown in FIG. 2, the RN sends CompAck 318 to the HN before the data has arrived from SN (or from the HN). When the HN receives CompAck 318, it releases resources allocated to Read transaction. The resources of the I-IN are in use for the time period T5-T6. This period is considerably shorter than the period T3-T4 in FIG. 2. However, once the transaction is completed in the HN, the HN is free send a snoop message 320, if so requested, arriving at the RN at time T4. The RN is aware that data has been requested for the snooped address(es) and delays response 322 to the snoop message until time T5, when all the requested data has been received by the RN. As before, if the requested data is present in the cache of the HN, the data is sent directly from the I-IN to the RN and no messages are exchanged with the SN.

The mechanism shown in FIG. 3 reduces the time period over which resources of the HN are allocated to the Read transaction, thereby allowing for an increase in overall system performance.

FIG. 4 is a further transaction flow diagram for data access in a data processing network, in accordance with various representative embodiments. FIG. 4 is variation on FIG. 3, in which Read request 402 is issued with ExpCompAck=0, indicating that the HN should not expect a completion acknowledgement message from the RN. Since the HN does not need to wait for the message, the HN's processing of the Read transaction is terminated at time T6, when ReadReceipt 314 is received from the SN. Such Read requests are to non-coherent memory and also do not need any program ordering to be maintained.

FIG. 3 and FIG. 4 show embodiments of a method for performing a read transaction in a data processing network. A Request Node of the data processing network sends a read request to read data associated with a first address. The read request is sent via a coherent interconnect to a Home Node of the data processing network, where the Home Node provides a point of coherency for data associated with the first address. The Request Node receives a RespSepData message that is sent from the Home Node responsive to the read request. The first response message (RespSepData) indicates that a read transaction has been ordered in the Home Node and that data for the read transaction is provided in a separate data response. The Request Node receives a second response message (DataSepResp) comprising the data associated with the first address. The second response message (DataSepResp) indicates that only the data is provided and the Request Node will also receive a separate response from Home Node. The second response message (DataSepResp) is sent from the Home Node when the data associated with the first address is present in a system cache of the Home Node and is sent from a Slave Node when the data associated with the first address is not present in the system cache of the Home Node.

The read request may be sent on a request (REQ) channel of the coherent interconnect, the RespSepData message on a response (RSP) channel and the DataSepResp message on a data (DAT) channel.

In the embodiment shown in FIG. 3, the Request Node sends a completion acknowledgement message (CompAck) to the Home Node responsive to the Request Node receiving the RespSepData message from the Home Node. The Home Node terminates the read transaction in response to receiving the first CompAck message from the Request Node, where terminating the transaction comprises freeing resources of the Home Node allocated to the transaction and allowing snoop messages to the Request Node for data at the first address.

When the requested data is not present at the Home Node, in a system cache for example, the Home Node sends a first slave read request (ReadNoSnpSep) to the Slave Node, the ReadNoSnpSep request indicating that the Slave Node should send only a data response to the Request Node, where the ReadNoSnpSep request is sent on a REQ channel of the coherent interconnect. The Slave Node then sends a read receipt to the Home Node.

In the embodiment shown in FIG. 4, the Home Node terminates the read transaction responsive receiving the read receipt from the Slave Node, where, again, terminating the read transaction comprises freeing resources of the Home Node allocated to the transaction and allowing snoop messages to the Request Node for data at the first address.

FIG. 5 is a further transaction flow diagram for data access in a data processing network, in accordance with various representative embodiments. As in FIG. 4, Read request 402 is issued with ExpCompAck=0, indicating that the HN should not expect a CompAck message from the RN. Again, since the HN does not need to wait for the message, the HN's processing of the Read transaction is terminated at time T6, when ReadReceipt 314 is received from the SN. However, in FIG. 3 and FIG. 4, the HN sent RespSepData message 312 to the RN and slave read request (ReadNoSnpSep) 502 message to the SN—indicating that the SN should send separate receipt (314) and data (316) responses. In FIG. 5, the HN does not send a RespSepData message to the RN. Instead, the SN sends CompData message 504 to the RN to provide the requested data and acknowledge completion of the transaction.

Thus FIG. 5 shows an embodiment of a method for performing a read transaction in a data processing network in which a Request Node sends a read request to read data associated with a first address. The read request is sent via a coherent interconnect to a Home Node of the data processing network, where the Home Node provides a point of coherency for data associated with the first address. In response, the Home Node sends a ReadNoSnp request to a Slave Node, the ReadNoSnp request indicating that the Slave Node should send only a data response to the Request Node, where the ReadNoSnp request is sent on a REQ channel of the coherent interconnect, for example. The Slave Node, in response, sends a read receipt back to the Home Node. In addition, the Slave Node sends a CompData message, comprising the data associated with the first address, to the Request Node. The message also indicates completion of the read transaction. The CompData message may be sent on a data (DAT) channel of the coherent interconnect, for example. The Home Node terminates the read transaction in the Home Node in response to receiving the read receipt from the Slave Node.

In the description above, example mechanisms for a Read transaction have been described. These mechanisms may be used for all Read transactions. The mechanism may not be appropriate for all read transactions, however, and conventional mechanisms may be used for atomic transactions, read transactions with exclusives, or ordered read transactions without a complete-acknowledge (CompAck) response.

As described above, several new messages are added to existing protocols to support the new mechanism, namely:

DataSepResp: Data without completion (Comp) response:
    Indicates that only the data is provided and the Requester will also receive a separate response from Home Node.
    Sent by either Slave Node or Home Node.
    Sent on data (DAT) channel. The Data opcode field may be extended to allow an additional opcode (e.g. 0xB, in which case the Data opcode field is extended by 4-bits).

RespSepData: Comp response without Data for a Read request:
    Indicates that the transaction has been ordered at the Home Node. The data for the transaction is provided in a separate data response.
    Sent from Home Node.
    Sent on response (RSP) channel, opcode 0xB.

ReadNoSnpSep—A request to tell the node that completes the request (the Completer) to send only a Data response.
    Request is from Home Node (HN-F or HN-I) to Slave Node (SN-F or SN-I).
    Sent on the REQ channel, opcode is 0x11.
    The Order field of the request must be set to 01.
        If the Home Node receives a RetryAck response from the Slave Node, it may be because sufficient resources are not available to process the request. In this case, the Home Node may retry the transaction when an appropriate credit is received.

Alternatively, a RetryAck response may indicate that the Slave Node does not support ReadNoSnpSep requests or is not capable of processing such a request for any other temporal reasons. In this case the Home Node may send a ReadNoSnp request instead of a ReadNoSnpSep request when it resends the request after receiving appropriate credit from the Slave Node.

Slave Node must provide a ReadReceipt response to Home Node and map:
  SrcID in request to TgtID in ReadReceipt response.
  TxnID in request to TxnID in ReadReceipt response.
Slave Node must provide a DataSepResp response to the node identified by the ReturnNID in the request, which might be either the original Requester or the Home by mapping:
  ReturnNID in request to TgtID in DataSepResp response.
  ReturnTxnID in request to TxnID in DataSepResp response.

The messages are used in a data processing network comprising a Request Node, a Home Node and a Slave Node coupled via a coherent interconnect. The Request Node is configured to send a read request to read data associated with a first address, where the read request is sent via the coherent interconnect to the Home Node, where the Home Node provides a point of coherency for data associated with the first address. The Request Node is further configured to receive a RespSepData message sent from the Home Node responsive to the read request, the RespSepData message indicating that a read transaction has been ordered in the Home Node and further indicating that data for the read transaction is provided in a separate data response. The data is received at the Request Node in a DataSepResp, the DataSepResp message indicating that the data is provided and the Request Node will also receive a separate response from Home Node. The DataSepResp message is sent from the Home Node when the data associated with the first address is present in a system cache of the Home Node, and is sent from a Slave Node when the data associated with the first address is not present in the system cache of the Home Node.

The coherent interconnect may include a request (REQ) channel, a response (RSP) channel, and a data (DAT) channel, in which case the read request is sent on the REQ channel, the RespSepData message is sent on the RSP channel and the DataSepResp message is sent on the DAT channel.

The Request Node may also send a first CompAck acknowledgement message to the Home Node responsive to the Request Node receiving the RespSepData message from the Home Node and a second CompAck acknowledgement message to the Home Node responsive to the Request Node receiving the DataSepResp message.

The Home Node may be configured to terminate the read transaction in the Home Node responsive receiving the first CompAck message from the Request Node, where terminating the read transaction comprises freeing resources of the Home Node allocated to the transaction and allowing snoop messages to the Request Node for data at the first address.

The Home Node may, responsive to the read request from the Request Node, send a ReadNoSnpSep request to a Slave Node, the ReadNoSnpSep request indicating that the Slave Node should send only a data response to the Request Node. The ReadNoSnpSep request may be sent on a REQ channel of the coherent interconnect. The Home Node then receives a read receipt from the Slave Node, the read receipt generated by the Slave Node responsive to the ReadNoSnpSep request.

The Home Node may terminate the read transaction in the Home Node responsive to receiving the read receipt from the Slave Node, where terminating the read transaction comprises freeing resources of the Home Node allocated to the transaction and allowing snoop messages to the Request Node for data at the first address.

FIG. 3 shows an example of the structure of a Read transaction with separate Comp and Data responses. It is noted that the CompAck response is permitted, but not required, to wait for DataSepResp, except in the case of an ordered ReadOnce/ReadNoSnp request with CompAck, when it is required to wait for DataSepResp.

The Request/Response rules are:
  DataSepResp and RespSepData must only be sent by the Completer after the associated request is received. RespSepData is permitted from Home Node only. DataSepResp is permitted to be sent by the Slave Node or Home Node.
  CompAck acknowledgement must only be sent by the Requester after the RespSepData response is received. It is permitted, but not required, for a Requester to wait for any or all data to be received before sending a CompAck acknowledgement.
    For ReadOnce and ReadNoSnp requests with an Order requirement, it is required to wait for at least one data response to be received before sending a CompAck acknowledgement.
  It is required that the Completer must not wait for CompAck before sending all Data packets.
  Home Node must send ReadNoSnpSep to Slave Node only after associated Request is received.
  Slave Node must send ReadReceipt response to Home Node only after receiving ReadNoSnpSep and ensuring that it will not respond with RetryAck for that request. A RetryAck is a negative acknowledgement telling the sender that their request was not accepted and, if they wish, they should resend the request after it receives appropriate resource credit from the completer.
  ReadReceipt from Slave Node is sufficient to indicate to Home Node that the request to Slave Node is completed; a separate Comp response from Slave Node to Home Node is not required and must not be sent.
  For ReadOnce and ReadNoSnp transactions with an Order requirement that include separate Comp and Data response, the Home Node must not send a ReadReceipt response. The RespSepData response from Home Node includes an implied ReadReceipt.

In all cases, where a separate Data response and Home Node response can be used, however it is also permitted to use a combined CompData response as shown in FIG. 5.

Cache State.

The cache state for a read transaction is always provided alongside the data in the Response field with the DataSepResp or CompData response.

The RespSepData early response from Home Node is permitted to optionally include cache state information, as follows:
  If no state information is included with the RespSepData response is sent then the Response field must be set to all zeros, which is the same encoding as an Invalid state.
  If cache state information is included in the RespSepData response then the Resp field must be set to the appropriate cache state. It is required that the cache state information included in the DataSepResp response is identical to the state in the Response field.

Global Observation.

When a Requester receives the first DataSepResp it can consider the read transaction to be globally observed, as there is no action which can modify the read data received. A Home Node must ensure that all required snoop transactions are completed before initiating a transaction, such as a ReadNoSnpSep, which could result in the DataSepResp response being given to the Requester. There is no guarantee of global observability associated with a RespSepData response.

When a Requester receives a RespSepData response from Home Node, the Request that it applies to has been ordered at the Home Node and the Requester will not receive any snoops for transactions that are scheduled before it. The Home Node must ensure that no snoop transactions are outstanding to that Requester to the same address. Receipt of RespSepData also guarantees that any requests to the same address after the current request if required will send Snoops only after CompAck is sent.

When the Requester gives a CompAck acknowledgement, this Requester is indicating that it will accept responsibility to hazard snoops for any transaction that is scheduled after it. The following rules apply:

For all transactions, except as described immediately below, the CompAck acknowledgement must be given after the RespSepData response is received. It is permitted, but not required, to wait for the DataSepResp response before the CompAck acknowledgement is given.

For ReadOnce/ReadNoSnp transactions, with an ordering requirement (Order=10/11) and ExpCompAck field asserted, it is required that the CompAck acknowledgement is given only after both DataSepResp and RespSepData response are received.

It is noted that this specification requires that CompAck must not be given if only DataSepResp is received. The requester must wait for receipt of RespSepData.

ReadOnce and ReadNoSnp.

All fully coherent Read transactions, that is ReadClean, ReadNotSharedDirty, ReadShared and ReadUnique are required to have ExpCompAck asserted and the Order field set to zero.

The behavior of ReadOnce and ReadNoSnp transactions will depend on the Order requirement as well as the ExpCompAck behavior.

It is noted that CompAck is required when using ordered ReadOnce and ReadNoSnp so that the Home Node can determine when the Read is globally visible.

Table 1 below details the expected and permitted behavior for ReadOnce and ReadNoSnp transactions.

TABLE 1

Permitted behavior of ReadOnce and ReadNoSnp transactions.

| Transaction | Order | ExpCompAck | Notes |
|---|---|---|---|
| ReadOnce ReadNoSnp | 00 | 0 | Two options exist to complete the transaction: A single CompData response from the Slave Node is provided. A DataSepResp response from the Slave Node and a RespSepData response from the Home Node is provided. Note: The Home Node can determine which of these options is used depending on the transaction that the Home Node sends to the Slave Node. |
| ReadOnce ReadNoSnp | 00 | 1 | This combination of Order and ExpCompAck uses a CompAck acknowledgement that is not functionally required. Two options exist to complete the transaction: A single CompData response from the Slave Node can be provided. A DataSepResp response from the Slave Node and a RespSepData response from the Home Node is provided. CompAck can be given after RespSepData received. |
| ReadOnce ReadNoSnp | 10/11 | 0 | This combination of Order and ExpCompAck cannot use Dynamic Memory Transfer (DMT). The following applies: ReadReceipt is given from the Home Node to the Requester. CompData is given from the Home Node to the Requester. |
| ReadOnce ReadNoSnp | 10/11 | 1 | The following applies: ReadReceipt response is given from the Slave Node to the Home Node. RespSepData response is given from the Home Node to the Requester. DataSepResp response is given from the Slave Node to the Requester. CompAck acknowledgement must only be given by the Requester after both RespSepData and DataSepResp are received. |

This disclosed mechanism permits delinking the observability of a read transaction from receiving of data. This allows the Home Node to release hazarding and other transaction resources early. For non-coherent requests it even goes further by not requiring resources or hazard to be held as soon as "Accept acknowledgement" message is received from the memory controller instead of waiting for memory controller to read the data out of the memory controller and send it to the master.

This kind of transaction flow optimization permits the Home Node resources to be optimally utilized with minimum overhead. Also, this scales well with system size since the interconnect size, and thus increased data packet traversal latencies, do not require Home Node resources to be increased proportionately.

The request throughput through a Home Node is optimized considerably, as described above.

A further aspect of the disclosure relates to the handling of unneeded CompAck messages. In an operation where the RN requests non-ordered ReadOnce access resulting in a ReadNoSnp, the transaction flow permits a CompAck response. However, the response is not required for functional correctness. For simplicity of the Read handling logic in one embodiment, all read operations include the CompAck message whether or not the CompAck is permitted. In this case, in certain conditions when the Home resources are released early, a CompAck response might reach the Home Node after all knowledge of the corresponding request has been erased from the Home Node. This situation may be handled in a variety of ways. For example, in one embodiment, partial information comprising the source and transaction ID of the request is retained to enable identification of the CompAck owner, while all other information is erased. In an alternative embodiment, all request information is dropped and a counter is kept at the HN to track how many 'orphaned' CompAck responses will be received. This counter is incremented whenever a ReadReceipt is received from the Slave and decremented on receiving an orphaned CompAck from an RN. Other approaches will be apparent to those of ordinary skill in the art.

Figure 6:
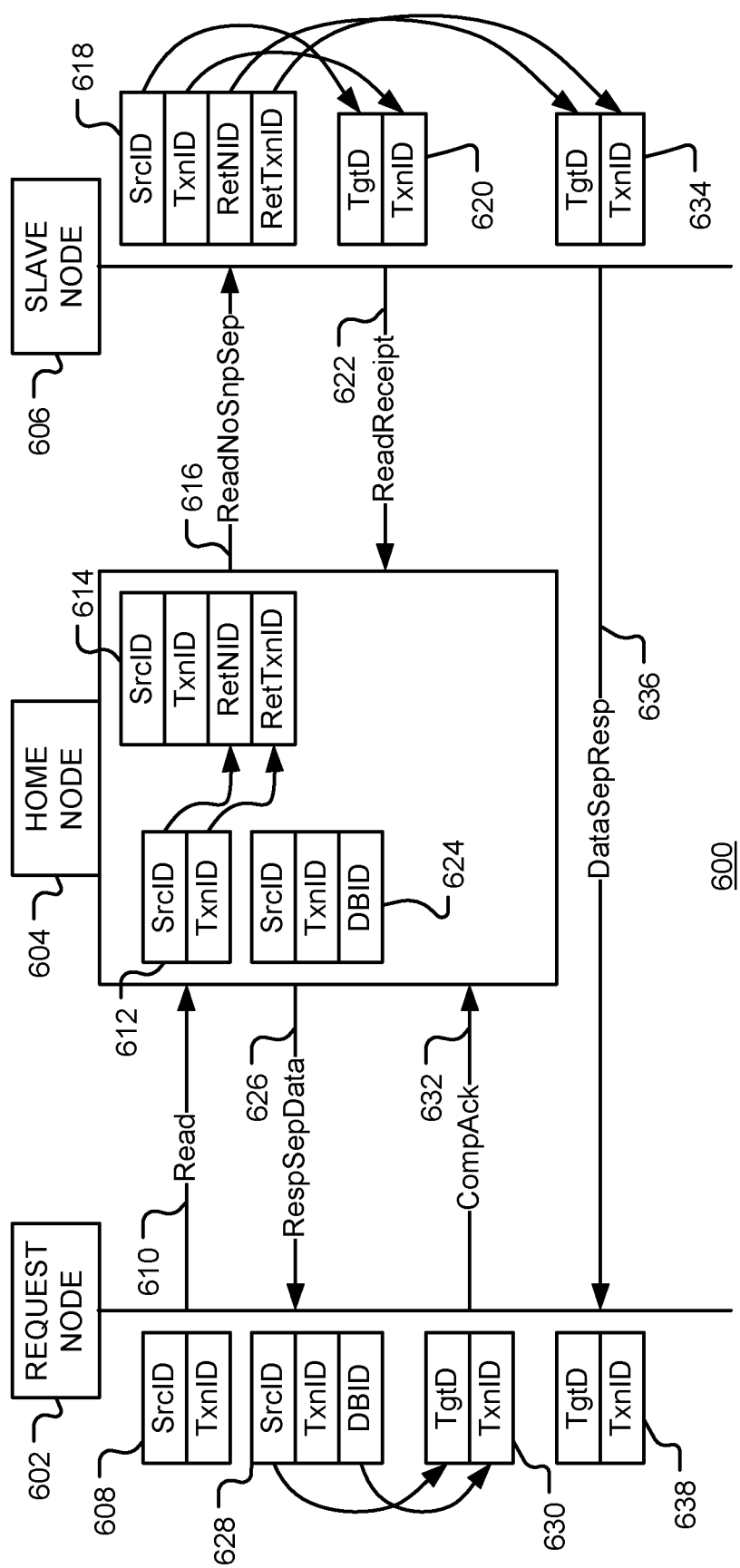
FIG. 6 is a block diagram illustrating transfer of identifiers in a data processing system, in accordance with various representative embodiments.

FIG. 6 is a block diagram illustrating transfer of identifiers in a data processing system 600, in accordance with various representative embodiments. FIG. 6 shows a read request by Request Node 602 to Home Node 604 that is serviced by Slave Node 606. Identifiers 608 comprise Source identifier (SrcID) and transaction identifier (TxnID) that are sent in read request 610 to Home Node 604 and stored as identifiers 612. Home Node 604 generates identifiers 614 by mapping SrcID to return node identifier (RetNID) and mapping TxnID to a return transaction identifier (RetTxnID). These identifiers are sent to Slave Node 606 in ReadNoSnpSep request 616 and are saved as identifiers 618 at the Slave node. Identifiers 620 include a target identifier (TgtID), mapped from the SrcID, and the transaction identifier TxnID. These identifiers are sent back to the Home Node in ReadReceipt 622 to enable the Home Node to associate the Receipt with the request. Home Node 604 allocates a data buffer identifier (DBID) that, together with the SrcID and TxnID form identifiers 624 that are sent in RspSepData message 626 back to Request node 602 and provide identifiers 628. In response, Request Node 602 sends identifiers 630 in CompAck message 632 back to the Home Node. Upon receipt of the CompAck message 632, the transaction at the Home Node is complete. Separately, Slave Node 606 sends identifiers 634 (and the requested data) in DataSepResp message 636 to the Request Node. The received transaction ID (TxnID) in identifiers 638 enables the Request Node to associate the received data with the original read request.

Those skilled in the art will recognize that the present disclosure invention has been described in terms of exemplary embodiments. The present invention could be implemented using hardware component equivalents such as special purpose hardware and/or dedicated processors which are equivalents to the disclosure as described and claimed. Similarly, dedicated processors and/or dedicated hard wired logic may be used to construct alternative equivalent embodiments of the present disclosure.

Dedicated or reconfigurable hardware components used to implement the disclosed mechanisms may be described by instructions of a Hardware Description Language or by netlist of components and connectivity. The instructions or the netlist may be stored on non-transient computer readable medium such as Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using dedicated hardware, configurable hardware or programmed processors executing programming instructions that are broadly described in flow chart form that can be stored on any suitable electronic storage medium or transmitted over any suitable electronic communication medium. A combination of these elements may be used. Those skilled in the art will appreciate that the processes and mechanisms described above can be implemented in any number of variations without departing from the present disclosure. For example, the order of certain operations carried out can often be varied, additional operations can be added or operations can be deleted without departing from the disclosure. Such variations are contemplated and considered equivalent.

The various representative embodiments, which have been described in detail herein, have been presented by way of example and not by way of limitation. It will be understood by those skilled in the art that various changes may be made in the form and details of the described embodiments resulting in equivalent embodiments that remain within the scope of the present disclosure.

Accordingly, some aspects and features of the disclosed embodiments are set out in the following numbered items:

1. A method for performing a read transaction in a data processing network, the method comprising: sending, by a Request Node of the data processing network, a read request to read data associated with a first address, where the read request is sent via a coherent interconnect to a Home Node of the data processing network, where the Home Node provides a point of coherency for data associated with the first address; receiving, by the Request Node, a first response message sent from the Home Node responsive to the read request, the first response message indicating that a read transaction has been ordered in the Home Node and further indicating that data for the read transaction is provided in a separate data response; and receiving, by the Request Node, a second response message comprising the data associated with the first address, the second response message indicating that only the data is provided and the Request Node will also receive a separate response from Home Node, where the second response message is sent from the Home Node when the data associated with the first address is present in a system cache of the Home Node, and where the second response message is sent from a Slave Node when the data associated with the first address is not present in the system cache of the Home Node.

2. The method of item 1, where: sending the read request to the Home Node comprises sending the read request on a request channel of the coherent interconnect, receiving the first response message comprises receiving the first response message on a response channel of the coherent interconnect, and receiving the second response message comprises receiving the second response message on a data channel of the coherent interconnect.

3. The method of item 1, further comprising: sending, by the Request Node, a completion acknowledgement message to the Home Node responsive to the Request Node receiving the first response message from the Home Node.

4. The method of item 3, further comprising: terminating, in the Home Node, the read transaction responsive to receiving the completion acknowledgement message from the Request Node, where terminating the transaction comprises freeing resources of the Home Node allocated to the transaction and allowing snoop messages to the Request Node for data at the first address.

5. The method of item 1, further comprising, sending, by the Home Node responsive to the read request, a first slave read request to the Slave Node, the first slave read request indicating that the Slave Node should send only a data response to the Request Node, where the first slave read request is sent on a request channel of the coherent interconnect; sending, by the Slave Node responsive to the first slave read request, a read receipt to the Home Node.

6. The method of item 5, further comprising: terminating, in the Home Node, the read transaction responsive receiving the read receipt from the Slave Node, where terminating the read transaction comprises freeing resources of the Home Node allocated to the transaction and allowing snoop messages to the Request Node for data at the first address.

7. The method of item 5, where the first slave read request comprises a source identifier and a transaction identifier, the method further comprising: mapping, by the Slave Node, the source identifier in the first slave read request to a target identifier in the read receipt; and mapping, by the Slave Node, the target identifier in the first slave read request to a transaction identifier in the read receipt.

8. The method of item 5, further comprising: sending, by the Slave Node to the Home Node, a RetryAck message when the first slave read request cannot be completed; when the Slave Node supports first slave read requests, sending, by the Home Node, a further first slave read request to the Slave Node when appropriate credit has been received from the Slave Node, and when the Slave Node is incapable of processing the first slave read request, sending, by the Home Node, a second slave read request to the Slave Node, the second slave read request indicating that the Slave Node should not send a separate response message to the Request Node.

9. The method of item 5, further comprising: the Slave Node mapping a return node identifier in the slave read request to a target identifier in the second response message; and the Slave Node mapping a return transaction identifier in the slave read request to a transaction identifier in the second response message.

10. A method for performing a read transaction in a data processing network, the method comprising: sending, by a Request Node of the data processing network, a read request to read data associated with a first address, where the read request is sent via a coherent interconnect to a Home Node of the data processing network, where the Home Node provides a point of coherency for data associated with the first address; ending, by the Home Node responsive to the read request, a slave read request to a Slave Node, the slave read request indicating that the Slave Node should send only a data response to the Request Node, where the slave read request is sent on a request channel of the coherent interconnect; sending, by the Slave Node to the Home Node responsive to the slave read request, a read receipt; and sending, by the Slave Node to the Request Node, a data completion message comprising the data associated with the first address, and indicating completion of the read transaction, where the data completion message is sent on a data channel of the coherent interconnect.

11. The method of item 10, further comprising: terminating, in the Home node, the read transaction responsive receiving the read receipt from the Slave Node, where terminating the read transaction comprises freeing resources of the Home Node allocated to the transaction and allowing snoop messages to the Request Node for data at the first address.

12. A data processing network comprising a Request Node, a Home Node and a Slave Node coupled via a coherent interconnect, where the Request Node is configured to perform a method comprising: sending a read request to read data associated with a first address, where the read request is sent via the coherent interconnect to the Home Node, where the Home Node provides a point of coherency for data associated with the first address; receiving a first response message sent from the Home Node responsive to the read request, the first response message indicating that a read transaction has been ordered in the Home Node and further indicating that data for the read transaction is provided in a separate data response; and receiving a second response message comprising the data associated with the first address, the second response message indicating that the data is provided and the Request Node will also receive a separate response from Home Node; where the second response message is sent from the Home Node when the data associated with the first address is present in a system cache of the Home Node, and where the second response message is sent from a Slave Node when the data associated with the first address is not present in the system cache of the Home Node.

13. The data processing network of item 12, where the coherent interconnect comprises a request channel, a response channel, and a data channel, and where the read request is sent on the request channel, the first response message is sent on the response channel and the second response message is sent on the data channel.

14. The data processing network of item 12, where the method performed by the Request Node further comprises: sending a completion acknowledgement message to the Home Node responsive to the Request Node receiving the first response message from the Home Node.

15. The data processing network of item 14, where the Home Node is configured to perform a method comprising: terminating the read transaction in the Home Node responsive receiving the completion acknowledgement message from the Request Node, where terminating the read transaction comprises freeing resources of the Home Node allocated to the transaction and allowing snoop messages to the Request Node for data at the first address.

16. The data processing network of item 12, where the Home Node is configured to perform a method comprising: sending, responsive to the read request from the Request Node, a Slave read request to the Slave Node, the Slave read request indicating that the Slave Node should send only a data response to the Request Node, where the Slave read request is sent on a request channel of the coherent interconnect; and receiving a read receipt from the Slave Node, the read receipt generated by the Slave Node responsive to the Slave read request.

17. The data processing network of item 16, where the method performed by the Home Node further comprises: terminating, in the Home Node, the read transaction responsive receiving the read receipt from the Slave Node, where terminating the read transaction comprises freeing resources of the Home Node allocated to the transaction and allowing snoop messages to the Request Node for data at the first address.

18. The data processing network of item 12, formed on a single chip.

19. A non-transitory computer readable medium comprising instructions of a Hardware Description Language descriptive of the data processing network of item 12.

20. A non-transitory computer readable medium storing a netlist of components and connectivity of the data processing network of item 12.

We claim:

1. A method for performing a read transaction in a data processing network, the method comprising:
    sending, by a Request Node of the data processing network, a read request to read data associated with a first address, where the read request is sent via a coherent interconnect to a Home Node of the data processing network, where the Home Node provides a point of coherency for data associated with the first address;
    receiving, by the Request Node, a first response message sent from the Home Node responsive to the read request, the first response message indicating that a read transaction has been ordered in the Home Node and further indicating that data for the read transaction is provided in a separate data response; and
    receiving, by the Request Node, a second response message comprising the data associated with the first address, the second response message indicating that only the data is provided and the Request Node will also receive a separate response from Home Node,
    where the second response message is sent from the Home Node when the data associated with the first address is present in a system cache of the Home Node, and
    where the second response message is sent from a Slave Node when the data associated with the first address is not present in the system cache of the Home Node.

2. The method of claim 1, where:
    sending the read request to the Home Node comprises sending the read request on a request channel of the coherent interconnect,
    receiving the first response message comprises receiving the first response message on a response channel of the coherent interconnect, and
    receiving the second response message comprises receiving the second response message on a data channel of the coherent interconnect.

3. The method of claim 1, further comprising:
    sending, by the Request Node, a completion acknowledgement message to the Home Node responsive to the Request Node receiving the first response message from the Home Node.

4. The method of claim 3, further comprising:
    terminating, in the Home Node, the read transaction responsive to receiving the completion acknowledgement message from the Request Node,
    where terminating the transaction comprises freeing resources of the Home Node allocated to the transaction and allowing snoop messages to the Request Node for data at the first address.

5. The method of claim 1, further comprising,
    sending, by the Home Node responsive to the read request, a first slave read request to the Slave Node, the first slave read request indicating that the Slave Node should send only a data response to the Request Node, where the first slave read request is sent on a request channel of the coherent interconnect;
    sending, by the Slave Node responsive to the first slave read request, a read receipt to the Home Node.

6. The method of claim 5, further comprising:
    terminating, in the Home Node, the read transaction responsive receiving the read receipt from the Slave Node,
    where terminating the read transaction comprises freeing resources of the Home Node allocated to the transaction and allowing snoop messages to the Request Node for data at the first address.

7. The method of claim 5, where the first slave read request comprises a source identifier and a transaction identifier, the method further comprising:
    mapping, by the Slave Node, the source identifier in the first slave read request to a target identifier in the read receipt; and
    mapping, by the Slave Node, the target identifier in the first slave read request to a transaction identifier in the read receipt.

8. The method of claim 5, further comprising:
    sending, by the Slave Node to the Home Node, a Retry-Ack message when the first slave read request cannot be completed;
    when the Slave Node supports first slave read requests, sending, by the Home Node, a further first slave read request to the Slave Node when appropriate credit has been received from the Slave Node, and
    when the Slave Node is incapable of processing the first slave read request, sending, by the Home Node, a second slave read request to the Slave Node, the second slave read request indicating that the Slave Node should not send a separate response message to the Request Node.

9. The method of claim 5, further comprising:
    the Slave Node mapping a return node identifier in the slave read request to a target identifier in the second response message; and
    the Slave Node mapping a return transaction identifier in the slave read request to a transaction identifier in the second response message.

10. A method for performing a read transaction in a data processing network, the method comprising:
- sending, by a Request Node of the data processing network, a read request to read data associated with a first address, where the read request is sent via a coherent interconnect to a Home Node of the data processing network, where the Home Node provides a point of coherency for data associated with the first address;
- sending, by the Home Node responsive to the read request, a slave read request to a Slave Node, the slave read request indicating that the Slave Node should send only a data response to the Request Node, where the slave read request is sent on a request channel of the coherent interconnect;
- sending, by the Slave Node to the Home Node responsive to the slave read request, a read receipt; and
- sending, by the Slave Node to the Request Node, a data completion message comprising the data associated with the first address, and indicating completion of the read transaction, where the data completion message is sent on a data channel of the coherent interconnect.

11. The method of claim 10, further comprising:
- terminating, in the Home node, the read transaction responsive receiving the read receipt from the Slave Node, where terminating the read transaction comprises freeing resources of the Home Node allocated to the transaction and allowing snoop messages to the Request Node for data at the first address.

12. A data processing network comprising a Request Node, a Home Node and a Slave Node coupled via a coherent interconnect, where the Request Node is configured to perform a method comprising:
- sending a read request to read data associated with a first address, where the read request is sent via the coherent interconnect to the Home Node, where the Home Node provides a point of coherency for data associated with the first address;
- receiving a first response message sent from the Home Node responsive to the read request, the first response message indicating that a read transaction has been ordered in the Home Node and further indicating that data for the read transaction is provided in a separate data response; and
- receiving a second response message comprising the data associated with the first address, the second response message indicating that the data is provided and the Request Node will also receive a separate response from Home Node;

where the second response message is sent from the Home Node when the data associated with the first address is present in a system cache of the Home Node, and where the second response message is sent from a Slave Node when the data associated with the first address is not present in the system cache of the Home Node.

13. The data processing network of claim 12, where the coherent interconnect comprises a request channel, a response channel, and a data channel, and where the read request is sent on the request channel, the first response message is sent on the response channel and the second response message is sent on the data channel.

14. The data processing network of claim 12, where the method performed by the Request Node further comprises:
- sending a completion acknowledgement message to the Home Node responsive to the Request Node receiving the first response message from the Home Node.

15. The data processing network of claim 14, where the Home Node is configured to perform a method comprising:
- terminating the read transaction in the Home Node responsive receiving the completion acknowledgement message from the Request Node, where terminating the read transaction comprises freeing resources of the Home Node allocated to the transaction and allowing snoop messages to the Request Node for data at the first address.

16. The data processing network of claim 12, where the Home Node is configured to perform a method comprising:
- sending, responsive to the read request from the Request Node, a Slave read request to the Slave Node, the Slave read request indicating that the Slave Node should send only a data response to the Request Node, where the Slave read request is sent on a request channel of the coherent interconnect; and
- receiving a read receipt from the Slave Node, the read receipt generated by the Slave Node responsive to the Slave read request.

17. The data processing network of claim 16, where the method performed by the Home Node further comprises:
- terminating, in the Home Node, the read transaction responsive receiving the read receipt from the Slave Node, where terminating the read transaction comprises freeing resources of the Home Node allocated to the transaction and allowing snoop messages to the Request Node for data at the first address.

18. The data processing network of claim 12, formed on a single chip.

19. A non-transitory computer readable medium comprising instructions of a Hardware Description Language descriptive of the data processing network of claim 12.

20. A non-transitory computer readable medium storing a netlist of components and connectivity of the data processing network of claim 12.

* * * * *